United States Patent
Kawaminani

[15] 3,672,121
[45] June 27, 1972

[54] CONTAINER SEALING DEVICE

[72] Inventor: Kohachi Kawaminani, 35, 1-chome, Noehigashinocho, Jotoku, Osaka Japan

[22] Filed: Dec. 9, 1970

[21] Appl. No.: 96,307

[52] U.S. Cl. .................................................. 53/351
[51] Int. Cl. .................................................. B65b 7/28
[58] Field of Search .................... 53/344, 345, 350, 351, 354, 53/355, 368, 331

[56] References Cited

UNITED STATES PATENTS

| | | | |
|---|---|---|---|
| 1,249,025 | 12/1917 | Carvalho | 53/354 X |
| 1,560,059 | 11/1925 | Johnson | 53/354 X |
| 1,954,737 | 4/1930 | Kowal | 53/351 |
| 2,154,350 | 4/1939 | O'Neill, Jr. et al. | 53/344 X |
| 2,154,409 | 4/1939 | Podel | 53/351 X |
| 2,835,093 | 5/1958 | Ford et al. | 53/345 |

Primary Examiner—Travis S. McGehee
Assistant Examiner—Horace M. Culver
Attorney—Moonray Kojima

[57] ABSTRACT

A head unit to seal bottles and other similar containers with ductile metallic caps, having a central spindle with lower face plate and also a chuck with radially spaced fingers and jaws to be opened normally and closed when a bottle neck raises both the spindle and the chuck in a manner that the spindle is raised more than the chuck by the cushioning effect of springs, so that the chuck jaws may press and deform the metallic cap to the bottle neck in a tightly fitting relation as they slide along the bottle neck.

3 Claims, 9 Drawing Figures

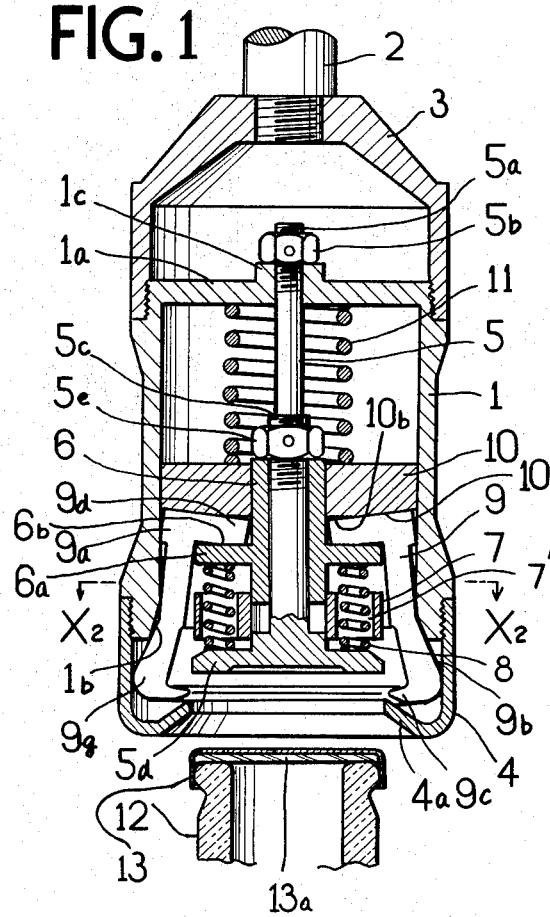
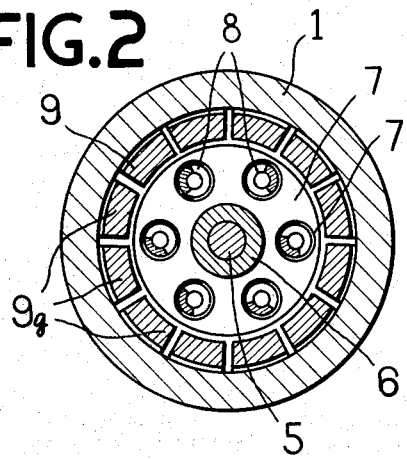
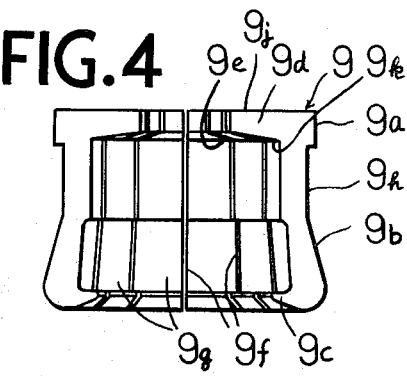
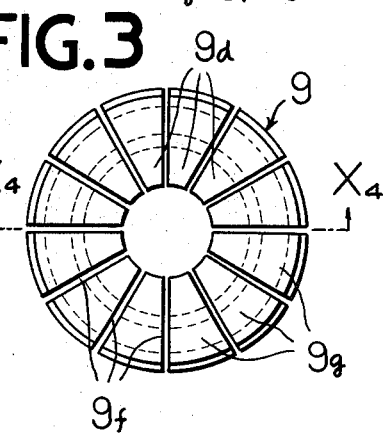
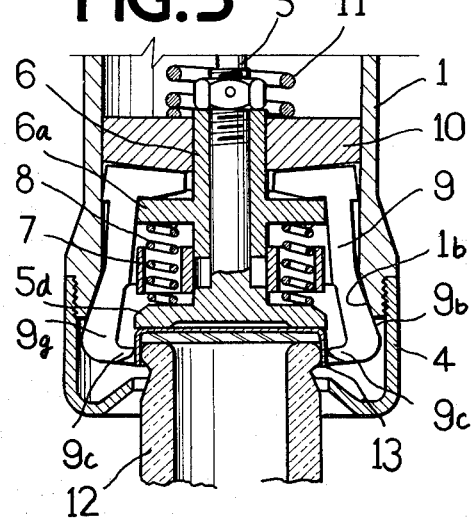
INVENTOR
KOHACHI KAWAMINANI
BY
ATTORNEY

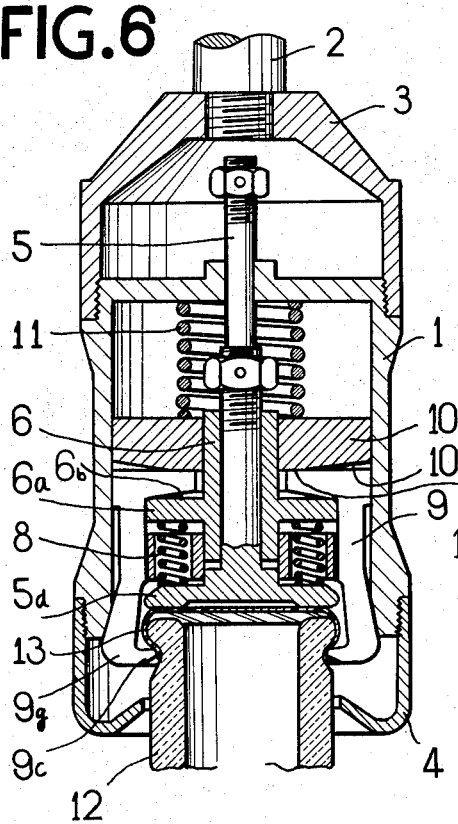
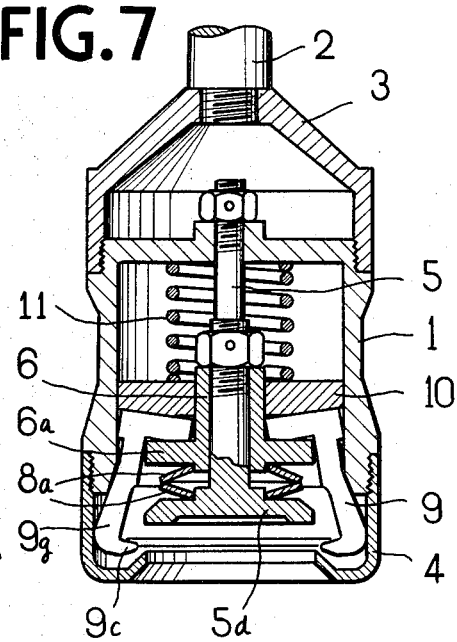
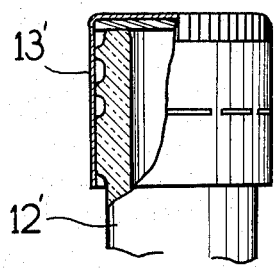
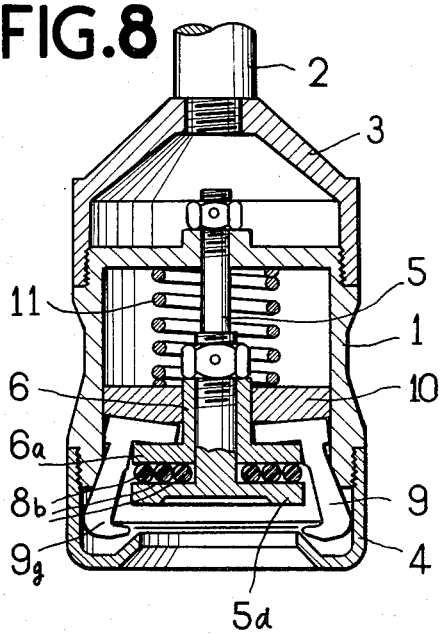

CONTAINER SEALING DEVICE

The present invention relates to a sealing device, and more particularly to a head unit in automatic machine for sealing bottles, cylindrical cans and other similar rigid containers with ductile metallic caps in tightly fitted relations by deforming such metallic cap into a groove or grooves provided for this purpose around the upper portion of such rigid container.

Conventionally in an automatic machine for sealing usual glass bottles with ductile thin metallic caps such as of aluminum, each bottle with a cap placed over the mouth is let to pass between a pair of rollers in a manner that the cap is pressed and deformed into a groove around the upper portion of bottle neck in a tightly fitting relation while the bottle is rotated 360° relative to the rollers in a pressed relation, given the pressing height of rollers relative to the bottom of bottle and the pressing gauge of rollers relative to the inner diameter of bottle neck groove.

The above-described roller-type sealing device will have considerable disadvantages. For instance, it will require a complicated mechanism to have the bottles pass between the rollers while being rotated in a pressed relation, and accordingly will be liable to frequent troubles reluctant to allow the machine to run in a reliable continuous operation. The 360° rotation of each bottle between the rollers will not allow the machine to run in a speedy efficient operation. The rollers and complicated relevant mechanism may not be sufficiently compact for installation. Since the pressing height of rollers relative to the bottom of bottle is given, it will be practically impossible to press and deform a metallic cap exactly into the groove of each bottle neck due to the fact that the height of groove relative to bottom of bottle is usually fluctuated to a considerable extent, and thus resulting in considerably deflected sealing. Since the pressing gauge of rollers relative to the inner diameter of bottle neck groove is given, it will also be practically impossible to press and deform a metallic cap neither excessively nor deficiently but sufficiently into the groove of each bottle neck due to the fact that the inner diameter of groove is usually fluctuated to a considerable extent, and thus resulting in considerably infirm sealing or accidental troubles; if the inner diameter of bottle neck groove is smaller than the given pressing gauge of rollers, the metallic cap will be pressed and deformed deficiently into the bottle neck groove and thus infirm sealing; if the inner diameter of bottle neck groove is larger than the given pressing gauge of rollers, the bottle will either be prevented from passing between the rollers or broken due to excessive pressing of the cap into the bottle neck groove and thus accidental troubles. It will further be practically impossible for the given pressing height and gauge of rollers to press and deform a metallic cap to the bottle neck in the area adjacent to the groove, especially the area from mouth to groove of bottle neck, in a tightly fitting relation, thus sometimes resulting in insufficient sealing. In addition, the roller-type sealing device may not easily adjustable of the given pressing height and gauge for various different configurations of bottle neck, and thus failing to permit of easy multiple application to various configurations of bottles.

It is known to overcome some of the above-mentioned disadvantages by replacing the roller-type sealing device with a chuck-type sealing device of the kind practically consisting of a head unit which includes a taper bore and a vertical cylinder having the lower end split into a plurality of radial fine fingers and jaws to serve as a chuck to seize a bottle neck with a metallic cap placed over the mouth. The cap is pressed and deformed into a groove around the upper portion of bottle neck in a tightly fitting relation as the chucking cylinder is inserted into the taper bore to have the fingers and jaws closed altogether radially around the cap in a pressing relation, given the pressing height of taper bore to the bottom of bottle and the pressing gauge of taper bore relative to the inner diameter of bottle neck groove.

The chuck-type sealing device of the above-described kind will definitely be simple in mechanism and compact for installation in comparision with the roller-type one, and it will not require to rotate the bottle at all for sealing unlike the roller-type one. Yet the chuck-type sealing device of the above-described kind cannot overcome the above-mentioned disadvantages attributed to the given pressing height and gauge, that is, deflected sealing, infirm sealing, accidental troubles, insufficient sealing and inapplicability to various configurations. Moreover, the split radial fingers and jaws composing a chuck are not only substantially fine in width but also integral to the main part of vertical cylinder without sufficient flexibility or freeness, and accordingly they will not be sufficiently durable but liable to bending and breaking as they press and deform metallic caps to bottle neck grooves, thus being reluctant to allow the machine to run in a reliable continuous operation. Once any one of the fingers and jaws be bent or broken, the metallic cap will get wrinkled as it is pressed and deformed into the groove of bottle neck, thereby failing to seal the bottle with the cap in a tightly fitted relation or, in other words, resulting in wrinkled sealing.

An important object of the invention is to provide a sealing device for bottles and other similar rigid containers which presses and deforms a ductile metallic cap exactly into a groove or grooves around the upper portion of such container in a tightly fitting relation even though the height of groove or grooves relative to bottom of container is fluctuated to a considerable extent.

Another important object of the invention is to provide a sealing device for bottles and other similar rigid containers which presses and deforms a ductile metallic cap neither excessively nor deficiently but sufficiently into a groove or grooves around the upper portion of such container in a tightly fitting relation even though the inner diameter of groove or grooves is fluctuated to a considerable extent.

Yet another important object of the invention is to provide a sealing device for bottles and other similar rigid containers which presses and deforms a ductile metallic cap not only into a groove or grooves but also over the area adjacent to the groove or grooves around the upper portion of such container in tightly fitting relation so as to improve sealing effect.

A further object of the invention is to provide a sealing device which easily permits of multiple application to various configurations of containers in sealing bottles and other similar rigid containers with ductile metallic caps in tightly fitted relations.

A further object of the invention is to provide a chuck-type head unit in automatic plant which is substantially durable and does not cause any substantially wrinkled sealing but fine-finished sealing in continuous operation to seal bottles and other similar rigid containers with ductile metallic caps in tightly fitted relations.

A further object of the invention is to provide a substantially compact chuck-type head unit in automatic machine to seal bottles and other similar rigid containers with ductile metallic caps in tightly fitted relations.

A still further object of the invention is to provide a sealing device with substantially simple and troubleless mechanism to permit of reliable continuous operation to seal bottles and other similar rigid containers with ductile metallic caps in tightly fitted relations.

A still further object of the invention is to provide a sealing device which permits of substantially speedy and efficient operation to seal bottles and other similar rigid containers with ductile metallic caps in tightly fitted relations.

Other objects and advantages of the invention will be more fully understood from the following description of preferred forms of the invention shown by way of examples in the accompanying drawings in which:

FIG. 1 is a vertical section of a head unit embodying the invention, when it does not seize a bottle neck which has a metallic cap placed over the mouth;

FIG. 2 is a cross section taken approximately on the line X2—X2 in FIG. 1;

FIG. 3 is a plan view of a chuck included in the head unit shown in FIG. 1;

FIG. 4 is a vertical section taken approximately on the line X4—X4 in FIG. 3;

FIG. 5 is a vertical section in part of the head unit shown in FIG. 1, when it seizes a bottle neck which has a metallic cap placed over the mouth;

FIG. 6 is a vertical section of the head unit shown in FIG. 1, when it seizes, and completes sealing of, a bottle neck which has a metallic cap placed over the mouth;

FIG. 7 is a vertical section of another embodiment of the invention;

FIG. 8 is a vertical section of still another embodiment of the invention; and

FIG. 9 is a fragmentary view, partially sectioned, of a bottle neck with a metallic cap placed over the mouth to be sealed by a head unit having a slightly modified chuck in accordance with the invention.

The embodiment shown in FIGS. 1 to 6 is a head unit in an automatic machine to seal usual glass bottles with ductile thin metallic caps such as of aluminum. Practically the head unit is suspended vertically from the automatic bottle sealing machine (not shown).

The head unit primarily comprises a cylindrical casing 1, a holder 3 mouted on the casing 1, a central spindle 5 supported vertically through the casing 1, a sleeve 6 provided on the lower portion of spindle 5, an annular distance piece 10 provided around the upper portion of sleeve 6, a chuck 9 suspended from the middle portion of sleeve 6, compression springs 8 provided around the lower portion of sleeve 6, and another compression spring 11 provided around the upper portion of spindle 5.

The casing 1 is a hollow vertical cylinder provided with a ceiling 1a at the upper end and a skirt 4 at the lower end. The inner wall of casing 1 is provided with a taper portion 1b at the lower end to be slidably in contact with the chuck 9. The ceiling 1a is provided with a central boss 1c to support the spindle 5. The lower surface of ceiling 1a serves as a washer for the upper end of spring 11. The skirt 4 is cylindrical and has the lower edge turned inwardly in the radial direction so as to provide a guide come 4a for a bottle neck 12 to enter the head unit upwardly as shown in FIGS. 1, 5 and 6.

The holder 3 is also a hollow vertical cylinder preferably coned in the upper portion as shown in FIGS. 1 and 6. The lower end of holder 3 is fixed to the ceiling 1a of casing 1 and the upper end of same is fixed to a support 2 which extends downwardly from the automatic bottle sealing machine (not shown) in a fixed relation, so that whole the head unit may be suspended vertically from the bottle sealing machine fixedly.

The central spindle 5 consists of two parts; an upper part 5a with a relatively small diameter and a lower part 5c with a relatively large diameter. The upper end of spindle 5, that is at the same time the upper end of 5a, is threaded for a nut 5b while the lower end of same spindle, that is at the same time the lower end of 5c, is provided with a lower member 5d flanged integrally around it, and the upper end of 5c which corresponds approximately to the middle portion of spindle 5 is threaded for a nut 5e, as shown in FIGS. 1 and 6. The spindle 5 is supported at the boss 1c with the nut 5b in a slidable relation to the boss 1c of ceiling 1. The lower surface of member 5d serves as a face plate to be in contact with an aluminum cap 13 placed over the mouth of bottle neck 12 when the bottle neck enters the head unit, and the upper surface of same member serves as an annular washer for the lower ends of springs 8.

The sleeve 6 is provided on the lower part 5c of spindle 5 in a slidable relation. The vertical sliding movement of sleeve 6 is defined by the nut 5e and the lower member 5d as best shown in FIGS. 1 and 6. The sleeve 6 is provided with a middle member 6a flanged intergrally around it. The upper surface of middle member 6a serves as a lower jaw to hold the chuck 9 in a suspending relation, and the lower surface of same serves as an annular washer for the upper ends of springs 8. The upper surface of middle member 6a consists of an plane 6b to be in contact with the chuck 9.

The annular distance piece 10 is provided around the upper portion of sleeve 6 in a slidable relation both to the outer wall of sleeve 6 and to the inner wall of casing 1. The upper surface of distance piece 10 serves as a washer for the lower end of spring 11, and the lower surface of same serves as an upper jaw to hold the chuck 9 in a compressing relation in combination with the upper surface of middle member 6a which serves as a lower jaw, as best shown in FIGS. 1 and 6. The lower surface of distance piece 10 consists of an inner plane 10b and an outer slope 10a to be in contact with the chuck 9.

The chuck 9 is composed of a plurality of fingers 9g arranged radially with equal spaces 9f as best shown in FIGS. 3 and 4. Each finger 9g comprises an upper horizontal root portion 9d, an upright middle portion 9h, a lower taper portion 9b and an inwardly pointed jaw portion 9c as best shown in FIG. 4. The root portion 9d is provided with a rim 9a in the outer periphery, the outer diameter of rim 9a being equal to the inner diameter of casing 1. The upper surface of root portion 9d consists of a plane 9j to be in contact with the lower surface of distance piece 10, while the lower surface of same consists of an inner slope 9e and an outer plane 9k to be in contact with the upper surface of middle member 6a. The rim 9a of each chuck finger 9g is slidably in more or less contact with the inner wall of casing 1. The taper 9b of each chuck finger 9g is slidably in more or less contact with the taper portion 1b of the inner wall of casing 1. The jaw 9c of each chuck finger 9g is to be slidably in contact with the cap 13 placed over the bottle mouth when the chuck 9 seizes the bottle neck 12. When the chuck 9 does not seize the bottle neck 12 at all, the chuck fingers 9g will be opened altogether radially as shown in FIG. 1, where the slope 9e and plane 9j of each chuck finger 9g are in contact with the plain 6b of middle member 6a and the slope 10a of distance piece 10, respectively, by the compression of springs 8 and 11; the rim 9a and taper 9b of each chuck finger 9g are slidably in less contact with the inner wall of casing 1. When the chuck 9 seizes the bottle neck 12, the chuck fingers 9g will be closed altogether radially as best shown in FIG. 6, where the planes 9k and 9j of each chuck finger 9g are in contact with the plane 6b of middle member 5a and the plane 10b of distance piece 10, respectively, by the compression of springs 8 and 11; the rim 9a and taper 9b of each chuck finger 9g are slidably in more contact with the inner wall of casing 1.

The compression springs 8 are positioned in a plurality of apertures 7' arranged radially with equal spaces in an annular disc 7 which is mounted on the lower member 5d of spindle 5 for this purpose, as best shown in FIG. 2. Both ends of each spring 8 are defined by the middle member 6a of sleeve 6 and the lower member 5d of spindle 5, respectively. The springs 8 endure the total gravity of sleeve 6, chuck 9, distance piece 10 and spring 11 against the elasticity of spring 11. The compression of springs 8 altogether is such that the sleeve 6 may always be kept intact from the lower member 5d of spindle 5 with a more or less clearance being left between the lower end of sleeve 6 and the upper surface of member 5d, in other words, the sleeve 6 may always be in floating relation to the lower member 5d, as shown in FIGS. 1, 5 and 6. The springs 8 are prestressed axially by the nut 5e so that they may always be kept in their own positions properly.

The compression spring 11 is arranged around the upper part 5a of spindle 5. Both ends of the spring 11 are defined by the ceiling 1a of casing 1 and the distance piece 10, respectively. The compression of spring 11 is such that the slope 9e and plane 9j of each chuck finger 9g may be in contact with the plane 6b of middle member 6a and the slope 10a of distance piece 10, respectively, when the chuck 9 does not seize the bottle neck 12 at all as shown in FIG. 1; and the planes 9k and 9j of each chuck finger 9g may be in contact with the plane 6b of middle member 6a and the plane 10b of distance piece 10, respectively, when the chuck 9 seizes the bottle neck 12 sufficiently as shown in FIG. 6. The spring 11 is prestressed axially by the nut 5b so that it may always be kept in its own position properly.

The spindle 5 is preset such that the lower member 5d may be sufficiently higher than the guide cone 4a of skirt 4 when the chuck 9 does not seize the bottle neck 12 as shown in FIG. 1, and that the lower member 5d may be sufficiently in contact with the cap 13 when the chuck 9 seizes, and completes sealing of, the bottle neck 12 as shown in FIG. 6. The presetting of spindle 5 is adjustable with the nut 5b; the spindle 5 can be desiredly forwarded or withdrawn axially relative to the casing 1 as the nut 5b is rotated around the threaded upper end of part 5a.

The chuck 9 is preset such that the jaws 9c may be higher than the guide cone 4a but lower than the lower member 5d when the chuck 9 does not seize the bottle neck 12 as shown in FIG. 1, that the jaws 9c may catch the cap 13, as shown in FIG. 5, at a portion just below the mouth but sufficiently above the neck groove of a bottle which has the maximum height of neck groove relative to bottom of bottle, and that the jaws 9c may press and deform the cap 13, as shown in FIG. 6, sufficiently into the neck groove of a bottle which has the minimum inner diameter of neck groove.

The presetting of chuck 9 is adjustable with the nuts 5b and 5e; the chuck 9 can be desiredly forwarded or withdrawn axially relative to the casing 1, either together with the spindle 5 as the nut 5b is rotated around the threaded upper end of part 5a, or together with the sleeve 6 being in slidable relation to the spindle 5 as the nut 5e is rotated around the threaded upper end of part 5c of the spindle 5 which remains stationary on this occasion. In either case, the jaws 9c of chuck 9 will be expanded or shrunk altogether radially relative to the casing 1 as the chuck 9 is forwarded or withdrawn axially relative to the casing 1 with the tapers 9b of chuck 9 being slidably in contact with the taper portion 1b of casing 1. It can therefore be said that the rotation of nut 5b adjusts the presetting of spindle 5 and chuck 9 altogether, and that the rotation of nut 5e adjusts the presetting of chuck 9 alone relatively to the spindle 5.

The relative elasticity of spring 11 and springs 8 is such that the spring 11 may be substantially more elastic than the springs 8 altogether when the chuck 9 does not seize the bottle neck 12 as shown in FIG. 1, and that the spring 11 may be approximately as elastic as the springs 8 altogether when the chuck 9 seizes the bottle neck as shown in FIG. 5 and 6. The relative elasticity of spring 11 and springs 8 is adjustable by rotating the nuts 5b and 5e.

Bottles to be sealed are usually carried on a turn table or a conveyor line. And the automatic bottle sealing machine is practically designed either to lower the head unit or raise the bottle vertically to a predetermined level when each bottle comes just under the head unit, so that the bottle neck 12 may enter the head unit through the guide cone 4a to have the aluminum cap 13 over the bottle mouth get into contact with the face plate of lower member 5d sufficiently; the predetermined level is such that the jaws 9c of chuck 9 may slide over the deepest portion in the neck groove of a bottle which has the minimum height of neck groove relative to bottom of bottle. The aluminum cap 13 is provided inside with a packing 13a such as of cork in usual manner.

In the operation, the automatic bottle sealing machine is initially put into running, and bottles each with an aluminum cap as 13 placed over the mouth are automatically carried to the head unit one after another. The chuck 9 does not yet seize any bottle neck, and now the head unit is in the state shown in FIG. 1. In this state, the slope 9e and plane 9j of each chuck finger 9g are in contact with the plane 6b of middle member 6a and the slope 10a of distance piece 10, respectively, while the rim 9a and taper 9b of each finger 9g are slidably in less contact with the inner wall of casing 1.

When a bottle comes just under the head unit, it is for instance raised automatically so as to let the bottle neck 12 enter the head unit through the guide cone 4a to have the aluminum cap 13 over the bottle mouth get into contact with the lower member 5d.

Then the spindle 5 is raised axially by the bottle neck 12, with the lower member 5d being in contact with the aluminum cap 13. In this case, the sleeve 6, chuck 9 and distance piece 10 are raised altogether substantially as much as the spindle 5 by the push of bottle neck 12 against the elasticity of spring 11 which is substantially more elastic than the springs 8 in this state; the rise of spindle 5 and bottle neck 12 is yet little cushioned by the compression of springs 8 and therefore causes substantially as much a rise of the sleeve 6, chuck 9 and distance piece 10 altogether as the spindle 5 itself. The chuck fingers 9g are closed altogether radially as the chuck 9 is raised with the tapers 9b of fingers 9g being slidable in contact with the taper portion 1b of casing 1. When the fingers 9g are closed, the chuck 9 seizes the bottle neck 12 with the jaws 9c catching the aluminum cap 13 in a slidable relation at a portion just below the mouth but sufficiently above the groove of bottle neck 12, and now the head unit is in the state shown in FIG. 5.

The spindle 5 is raised further axially by the bottle neck 12, with the lower member 5d still being in contact with the aluminum cap 13. In this case, the sleeve 6, chuck 9 and distance piece 10 are raised altogether further, but substantially less than the spindle 5, by the push of bottle neck 12 against the elasticity of spring 11 which is roughly as much elastic as the springs 8 in this state; the rise of spindle 5 and bottle neck 12 is now partly cushioned by the compression of springs 8 and therefore causes a less rise of the sleeve 6, chuck 9 and distance piece 10 altogether than the spindle 5 itself, and this results in a rise of the bottle neck 12 relative to the chuck 9 in a sliding relation while being seized by it. The chuck fingers 9g are closed altogether radially further as the chuck 9 is raised further with the tapers 9b of fingers 9g being slidably in contact with the taper portion 1b of casing 1. As the chuck fingers 9g are closed further, the jaws 9c press and deform the aluminum cap 13 to the bottle neck 12 with that much increased tightness.

It follows that the jaws 9c of chuck 9 press and deform the cap 13 to the bottle neck 12 in a tightly fitting relation for the effect of sealing as the bottle neck 12 with the cap 13 placed over the mouth is raised further in a sliding relation to the nails 9c after it is caught by the jaws 9c. The bottle, and accordingly the bottle neck 12, is raised continuously from the catching position to a sufficiently high level for the jaws 9c of chuck 9 to slide over the deepest portion in the bottle neck groove, and thereby the cap 13 is most definitely pressed and deformed into the groove in a tightly fitting relation. On this occasion, the aluminum cap 13 is pulled downward considerably by the friction of chuck jaws 9c sliding along the cap 13 in a pressing relation, and thereby deforming the cork packing 13a over the bottle mouth in a tightly closing relation. This completes sealing of the bottle neck 12 with the aluminum cap 13, and the head unit is now in the state shown in FIG. 6. In this state, the planes 9k and 9j of each chuck fingers 9g are in contact with the plane 6b of middle member 6a and the plane 10b of distance piece 10, respectively, while the rim 9a and taper portion 9b of each chuck finger 9g are slidably in more contact with the inner wall of casing 1.

After sealing is completed as above, the bottle is lowered automatically so as to let the bottle neck 12 tend to leave the lower member 5d and get out of the head unit. Then the chuck 9 is lowered by the bottle neck 12, with the jaws 9c of chuck 9 being engaged with the deformed portion of aluminum cap 13 in the groove of bottle neck 12. In this case, the spindle 5, sleeve 6 and distance piece 10 are lowered altogether with the chuck 9 by the pull of bottle neck 12 plus the elasticity of spring 11, the latter of which exerts a force downwardly to the inner periphery of plane 9j of each chuck finger 9g in contact with the plane 10b of distance piece so as to facilitable opening of the fingers 9g, while the fingers 9g are in a condition ready to be opened as the chuck 9 is lowered with the tapers 9b of fingers 9g slidably in contact with the taper portion 1b of casing 1. Thus the chuck fingers 9g are opened when the spring 11 exerts a force downwardly to the inner periphery of plane 9j of each finger 9g being in contact with the plane 10b.

Once the chuck fingers 9g are opened, the bottle neck 12 gets out of the head unit through the guide cone 4a while the spindle 5, springs 8, sleeve 6, chuck 9, distance piece 10 and spring 11 are all returned to their original state shown in FIG. 1. The bottle now completely sealed with the aluminum cap 13 is automatically carried away from the head unit, and another bottle not yet sealed will be automatically carried to the head unit, which will then repeat the above-described sealing operation continuously.

The aluminum cap 13 will be pressed and deformed exactly into the groove of bottle neck 12 in a tightly fitting relation without fail, because the jaws 9c of chuck 9 press and deform the cap 13 to the bottle neck in a sliding relation continuously from a portion above the groove of bottle neck 12 until they slide over the deepest portion in the bottle neck groove. And this can always be achieved even though the height of groove relative to bottom of bottle is fluctuated to a considerable extent, since the chuck 9 is preset such that the jaws 9c may catch the cap 13 at a portion sufficiently above the neck groove of a bottle which has the maximum height of neck groove relative to bottom of bottle, and the automatic bottle sealing machine is designed to raise each bottle vertically to such a predetermined level that the jaws 9c of chuck 9 may slide over the deepest portion in the neck groove of a bottle which has the minimum height of neck groove relative to bottom of bottle.

The aluminum cap 13 will not be pressed and deformed excessively into the groove of bottle neck 12 in a tightly fitting relation, because the rise of bottle neck 12 relative to chuck 9 is more or less cushioned by the compression of springs 8; if the jaws 9c of chuck 9 tend to press the bottle neck 12 excessively, the reaction of bottle neck will tend to open the jaws radially and thereby increase the friction between the tapers 9b of chuck fingers 9g and taper portion 1b of casing 1 so much that the rise of chuck 9 relative to bottle neck 12 will be delayed correspondingly, in other words, the bottle neck 12 will rise without the same delay as the chuck 9 by the cushioning effect attributed to the compression of springs 8, and therefore the chuck fingers 9g will not be closed correspondingly, resulting in no actual increase of tightness with which the jaws 9c press the bottle neck 12. Either the cap 13 will not be pressed and deformed deficiently into the groove of bottle neck 12, since the chuck 9 is preset such that the jaws 9c may press and deform the cap 13 sufficiently into the neck groove of a bottle which has the minimum inner diameter of neck groove. Therefore the aluminum cap 13 will be pressed and deformed neither excessively nor deficiently but sufficiently into the groove of bottle neck 12 in a tightly fitting relation even though the inner diameter of groove is fluctuated to a considerable extent.

The aluminum cap 13 will be pressed and deformed to the bottle neck 12 not only into the groove of bottle neck 12 but also in the area adjacent to the groove, that is, the area from mouth to groove of bottle neck in a tightly fitting relation, since the jaws 9c of chuck 9 press and deform the cap 13 to the bottle neck in a sliding relation continuously from a portion just below the mouth but sufficiently above the groove of bottle neck 12 until they slide over the deepest portion in the bottle neck groove, and this will increase the sealing effect of bottle neck remarkably. In addition, the cork packing 13a is deformed over the bottle mouth in a tightly closing relation as the chuck jaws 9c pull the cap 13 downward considerably by the friction in a sliding relation, and this will add to the increase of sealing effect considerably.

The presetting of spindle 5 is easily adjustable axially because it can be done simply by rotating the nut 5b around the upper end of spindle 5. The presetting of chuck 9 is also easily adjustable, both axial and radial, simply by rotating the nut 5e around the middle portion of spindle 5, sometimes together with the nut 5b if necessary. In addition, the relative elasticity of spring 11 and springs 8 is easily adjustable by rotating the nuts 5b and 5e. Taking acount of all these together with the feature that the chuck 9 presses and deforms the aluminum cap 13 to the bottle neck in a sliding relation over a considerable range of area inclusive of the neck groove, the head unit will be able to seal various configurations of bottle necks with ductile metallic caps in tightly fitted relations, if only given simple easy mechanical adjustments.

The fingers 9g of chuck 9 are not made integral to any other part of head unit, and thus there is no need of giving them any flexibility in relation to the other parts of head unit but they can be made of substantially rigid material. Moreover, the fingers 9g of chuck 9 are given a considerable degree of freeness between the middle member 6a and distance piece 10 which serve as a pair of jaws to hold the fingers 9g in a compressing relation. Therefore the fingers 9g with jaw portions 9c will not be liable to bending and breaking but quite durable in pressing and deforming duties in continuous operation. In addition, the fingers 9g of chuck 9 are mostly to be in surface-to-surface contact with the middle member 6a, distance piece 10 and casing 1, unlike line-to-line or spot-to-spot contact of more wearing nature, and this will add to the durability of fingers 9g. The fingers 9g will be opened and closed altogether radially in quite a uniform way as they are always slidably in contact with the inner wall of cylindrical casing 1. The high durability and uniform movement of chuck fingers 9g will not cause any substantially wrinkled sealing but fine-finished sealing.

The whole head unit consists of a compact cylindrical shell and is suspended vertically from the automatic bottle sealing machine as shown for instance in FIG. 1. The mechanism is quite simple as shown for instance in FIG. 1; all the members are arranged mechanically around one central spindle 5 and is driven by the simple vertical movement of bottle neck 12 through elasticity of springs 8 and 11 so as to continue troubleless operation. There is no need of rotating each bottle for sealing, but the bottle is sealed in a moment when it is raised into the head unit as it passes under the head unit, thus permitting of speady efficient operation.

It will be possible for the head unit of the invention to seal a bottle neck having a plurality of grooves with a ductile metallic cap in a tightly fitted relation, if it is provided with a comparatively long fingers of chuck 9. Such a bottle neck may be configured for example as shown in FIG. 9, where the bottle neck is designated as 12' and the aluminum cap as 13'. In such a case, the chuck with comparatively long fingers will press and deform the cap 13' to the bottle neck 12' in a sliding relation over a comparatively long range including several grooves.

It may be good to employ a plurality of leaf springs 8a as shown in FIG. 7, or a plurality of rubber rings 8b as shown in FIG. 8, in place of the coil springs 8 shown in FIG. 1. The leaf springs 8a or rubber rings 8b will serve to cushion the rise of spindle 5 relative to chuck 9 as well as the coil springs 8, and will make the whole head unit much smaller as shown in FIGS. 7 and 8 than the one with coil springs 8 shown in FIG. 1, thus providing a substantially compact chuck-type head unit.

Because of the good applicability to various configurations of bottle necks, the head unit of the invention can even be applied to seal cylindrical cans and other similar rigid containers with ductile metallic caps in tightly fitted relations quite satisfactorily.

It will thus be seen that the container sealing device in accordance with the invention can seal bottles, cylindrical cans and other similar rigid containers of various configurations with ductile metallic caps in tightly fitted relations quite satisfactorily with compact and simple mechanism in speedy continuous operation, even though there is a considerable fluctuation in the height and inner diameter of a groove or grooves around the upper portion of such container.

Since certain changes and modifications may be made in the invention, some of which have been herein suggested, it is intended that the foregoing shall be construed in a descriptive rather than in a limiting sense.

What I claim:

1. A sealing device of the kind to seal bottles, cylindrical cans and other similar rigid containers with ductile metallic caps, comprising a cylindrical hollow casing provided with an upper ceiling and a lower skirt, a holder mounted on said ceiling and having suspension means thereon, a central spindle supported vertically through said casing in a slidable relation to said ceiling and consisting of an upper part with a relatively small diameter and a lower part with a relatively large diameter being provided with a lower member at the lower end thereof in an integrally flanged relation, a sleeve provided on the lower part of said spindle in a slidable relation and provided with a middle member in an integrally flanged relation, an annular distance piece provided around said sleeve above said middle member in a slidable relation both to the outer surface of said sleeve and to the inner wall of said hollow cylindrical casing, a chuck composed of a plurality of radially spaced fingers and suspended from the middle member of said sleeve, compression spring means provided around said sleeve between said middle member and said lower member, and another compression spring means provided around the upper part of said spindle between said ceiling and said distance piece; each of said chuck fingers being provided with an upper root portion, a lower taper and a jaw at the lower end of said taper, said sleeve being above said lower member in a floating relation against the elasticity of said spring means provided between said middle member and said lower member, said distance piece and said middle member holding the upper root portions of said chuck therebetween in a compressing relation by the compression of both of said spring means, the inner wall of said hollow cylindrical casing being provided with a taper portion around the lower end thereof, the tapers of said chuck fingers being slidably in contact with the taper portion of said casing, wherein said chuck fingers are opened normally and closed when a container with a ductile metallic cap placed thereon comes into the chuck through said skirt and raises said spindle relative to said chuck against the elasticity of said compression spring means with said metallic cap being in contact with the lower member of said spindle, thereby the jaws of said chuck fingers pressing and deforming said cap to the upper portion of said container in a tightly fitting relation as said jaws slide along the upper portion of said container.

2. A sealing device in accordance with claim 1, wherein the upper part of said spindle is provided with screw means to adjust said spindle and said chuck together relative to said casing.

3. A sealing device in accordance with claim 2, wherein the lower part of said spindle is provided with screw means to adjust said chuck relative to said spindle.

* * * * *